United States Patent [19]

Oyamada et al.

[11] 4,094,849

[45] June 13, 1978

[54] PROCESS FOR PRODUCING AQUEOUS DISPERSION OF ETHYLENE-VINYL ACETATE COPOLYMER CONTAINING NO FORMALIN

[75] Inventors: Takeo Oyamada; Kazuhisa Satoh; Shinobu Tsuru, all of Ichihara; Masahiro Domoto, Toyonaka; Shizuo Narisawa, Ichihara, all of Japan

[73] Assignee: Sumitomo Chemical Company, Limited, Japan

[21] Appl. No.: 736,100

[22] Filed: Oct. 27, 1976

[30] Foreign Application Priority Data

Nov. 4, 1975 Japan .................................. 50-132694

[51] Int. Cl.$^2$ ............................................. C08L 31/00
[52] U.S. Cl. ................. 260/29.6 MQ; 260/29.6 MM; 260/29.6 R; 526/208
[58] Field of Search ................. 200/29.6 MQ, 29.6 R, 200/29.6 MM; 526/208

[56] References Cited

U.S. PATENT DOCUMENTS

| 3,714,099 | 1/1973 | Biale ............................ 260/29.6 MQ |
| 3,746,671 | 7/1973 | Zima et al. ................... 260/29.6 MQ |
| 3,770,679 | 11/1973 | Corey et al. ................ 260/29.6 MQ |
| 3,816,362 | 6/1974 | Tsuchihara et al. ........ 260/29.6 MQ |
| 3,844,990 | 10/1974 | Lindemann et al. ........ 260/29.6 MQ |
| 3,864,297 | 2/1975 | Hornbaker et al. ......... 260/29.6 MQ |

*Primary Examiner*—Eugene C. Rzucidlo
*Attorney, Agent, or Firm*—Birch, Stewart, Kolasch and Birch

[57] ABSTRACT

A process for producing an aqueous dispersion of ethylene-vinyl acetate copolymer containing no formalin by emulsion-polymerizng ethylene and vinyl acetate and optionally other copolymerizable vinyl monomers in the presence of a redox catalyst consisting of an oxidizing agent and a reducing agent, which is characterized in that a reaction product of a glyoxal compound and an alkali metal, ammonium or zinc salt of a reductive sulfur oxide is used as the reducing agent for the redox catalyst, in which process the polymerization temperature is easily controlled.

7 Claims, No Drawings

PROCESS FOR PRODUCING AQUEOUS DISPERSION OF ETHYLENE-VINYL ACETATE COPOLYMER CONTAINING NO FORMALIN

The present invention relates to a process for producing an aqueous dispersion of an ethylene-vinyl acetate copolymer containing no formalin by a redox emulsion-polymerization process which is excellent in the control of the polymerization temperature. More particularly, it relates to a process for producing an aqueous dispersion of an ethylene-vinyl acetate copolymer containing no formalin by subjecting ethylene and vinyl acetate and optionally other copolymerizable vinyl monomers to a redox emulsion-polymerization which is characterized in that a reaction product of a glyoxal compound and an alkali metal, ammonium or zinc salt of an reductive sulfur oxide is used as a reducing agent for the redox catalyst.

Aqueous dispersions of ethylene-vinyl acetate copolymer have, hitherto, been widely used in various fields, such as adhesives, paints, coating agents, fiber or paper processings, building materials, or the like. It is well known that the aqueous dispersions can be produced by an emulsion-polymerization using a redox catalyst consisting of a combination of an oxidizing agent (i.e. a radical-forming compound) and a reducing agent (i.e. an activating agent). For instance, it is described in H. Warson; "Synthetic Emulsion", Ernst Ben Limited, London, 1972 that aqueous dispersions of various polymers or copolymers are produced by an emulsion-polymerization process using a redox catalyst, particularly, on pages 106 to 107 of said literature, referring to British Patent Specification Nos. 1,068,970 and 1,117,711, there is described the production of an ethylene-vinyl acetate copolymer by a redox emulsion-polymerization process.

It is also well known that the copolymers are industrially produced by a redox emulsion-polymerization process since the redox polymerization process has advantages that the activation energy is very low and the polymerization can be conducted at a low temperature.

In the industrial production of an aqueous dispersion of an ethylene-vinyl acetate copolymer by an emulsion-polymerization process using a redox catalyst, it is the most important factor that the polymerization temperature can be constantly maintained and further can be easily controlled. If the polymerization temperature can not easily be controlled, the desired product having constant properties can not be obtained and further there results the occurrence of undesirable phenomena, such as gelation of the aqueous dispersion and occurrence of coarse particles during the polymerization reaction.

The control of the polymerization temperature is usually carried out by (1) the control of the addition amount of the catalyst, (2) the control of the addition amount of the monomers for the polymerization, or (3) the removal of the heat of reaction, particularly in a combination of (1), (2) and (3) or of (1) and (3). Thus, the control of the addition amount of the catalyst (1) performs an important role in the control of the polymerization temperature.

For controlling the polymerization temperature, the reducing agent for the redox catalyst should be capable of efficiently and stably decomposing the oxidizing agent to permit the formation of radicals and to smoothly initiate the polymerization reaction. When the reducing agent employed can not efficiently and stably decompose the oxidizing agent to provide radicals, an induction period is present prior to the initiation of the exothermic reaction, and as the result, a violent exothermic reaction occurs because of an addition of the catalyst in an excess amount thereof, and even if the addition amounts of the oxidizing and reducing agents and further the monomers are controlled, it is very difficult to control the polymerization reaction. Moreover, when such a reducing agent is used in the industrial production of an aqueous dispersion of an ethylene-vinyl acetate copolymer, it is extremely difficult to control the polymerization temperature, and further, the automatic control of the polymerization temperature with a gauge is not feasible.

It is known that formaldehyde sodium sulfoxylate is useful as a reducing agent for controlling the polymerization temperature. For instance, it is stated in the above literature "Synthetic Emulsion" by H. Warson, page 16 that formaldehyde sodium sulfoxylate is the most efficient reducing agent for the redox catalyst and the polymerization reaction can be initiated at such a low temperature as 0° C by using it in a combination with sodium persulfate, and further, there are described working examples of the production of an aqueous dispersion of an ethylene-vinyl acetate copolymer by an emulsion-polymerization wherein formaldehyde sodium sulfoxylate is used as the reducing agent for the redox catalyst in British Patent Specification Nos. 1,068,976 and 1,117,711, French Patent Specification No. 1,564,100 and Japanese Patent Specification Nos. 28,725/1970 and 4,169/1973. Moreover, Japanese Patent Laid Open Publication (unexamined) No. 51,020/1973 describes a working example of the production of an aqueous dispersion of an ethylene-vinyl acetate-vinyl chloride terpolymer while controlling the polymerization temperature with a gauge wherein formaldehyde sodium sulfoxylate is used as a reducing agent for the redox catalyst.

Thus, the formaldehyde sodium sulfoxylate is useful as the reducing agent for the redox catalyst, but it contains formaldehyde, and therefore, when it is used as the reducing agent for the redox catalyst in the emulsion-polymerization, the resulting aqueous dispersion of the ethylene-vinyl acetate copolymer is contaminated with harmful formaldehyde. Accordingly, it is not desirable to use the aqueous dispersion as an adhesive or coating agent for paper containers for foods or, non-woven fabrics which contact directly with human skin, or the like.

The present inventors have intensively studied to find an improved reducing agent containing no formalin and having still the same excellent properties as the conventional formaldehyde sodium sulfoxylate, which is suitable for the production of an aqueous dispersion of an ethylene-vinyl acetate copolymer containing no formalin by the redox emulsion-polymerization process, and it has now been found that a reaction product of a glyoxal compound and an alkali metal, ammonium or zinc salt of an reductive sulfur oxide is a useful reducing agent.

An object of the present invention is to provide an improved process for producing an aqueous dispersion of an ethylene-vinyl acetate copolymer containing no formalin by a redox emulsion-polymerization process.

Another object of the invention is to provide an improved reducing agent suitable for the redox catalyst used in the emulsion-polymerization of ethylene and vinyl acetate and optionally other copolymerizable vinyl monomers.

A further object of the invention is to provide an improved redox emulsion-polymerization process, wherein the polymerization temperature can easily be controlled.

These and other objects of the invention will be apparent from the following description.

According to the present invention, the desired aqueous dispersion of the ethylene-vinyl acetate copolymer containing no formaldehyde can be produced by emulsion-polymerizing ethylene and vinyl acetate and optionally other copolymerizable vinyl monomers in the presence of a redox catalyst wherein a reaction product of a glyoxal compound and an alkali metal, ammonium or zinc salt of a reductive sulfur oxide is used as the reducing agent.

When the glyoxal compound and the alkali metal, ammonium or zinc salt of the reductive sulfur oxide are each used alone, the polymerization reaction does not occur, or even if it occurs, the polymerization temperature is difficult to control and can not be automatically controlled by a gauge. Moreover, when the conventional reducing agents, such as amines (e.g. monoethanolamine, or triethanolamine), or 1-ascorbic acid or a salt thereof are used, the polymerization temperature is again difficult to control, and the resulting aqueous dispersion becomes colored with the lapse of time.

The reducing agent used in the present invention is a reaction product of glyoxal compound (e.g. glyoxal, or methylglyoxal) and an alkali metal, ammonium or zinc salt of a reductive sulfur oxide (e.g. sodium, potassium, ammonium or zinc salt of thiosulfuric acid, dithionous acid or pyrosulfurous acid, or sodium or potassium bisulfite), which is produced by reacting them in an aqueous medium. The reaction product may be used in the form of an aqueous solution thereof wherein the amount of water and the reactants are regulated or in the solid form after evaporating water from the aqueous solution. The reaction for the production of the product is not specifically limited, but may be carried out in a mixed solvent of an alcohol and water.

Moreover, the reducing agent may be produced in the polymerization system for the production of the ethylene-vinyl acetate copolymer during the polymerization reaction. For instance, to an aqueous dispersion of the monomers for the polymerization, wherein a glyoxal compound is contained, is added an aqueous solution of a salt of a reductive sulfur oxide before the initiation of the polymerization reaction, and thereby the required amount of the reducing agent is produced in the polymerization system and simultaneously the polymerization reaction proceeds in the same system. Alternatively, the glyoxal compound may be added to the aqueous dispersion containing the salt of the reductive sulfur oxide in addition to the monomers for the polymerization. Moreover, the glyoxal compound and the salt of the reductive sulfur oxide may be separately added to the aqueous dispersion of the monomers for the polymerization.

The reducing agent of the present invention may also favorably be used in a combination with other heavy metal salts, such as an iron salt or copper salt (so-called, a composite reducing agent).

The oxidizing agent used together with the reducing agent includes the conventional radical-forming compounds, such as hydrogen peroxide, organic peroxides (e.g. benzoyl peroxide, lauroyl peroxide, or t-butyl hydroperoxide), inorganic peroxides (e.g. ammonium persulfate, potassium persulfate, sodium persulfate, ammonium perborate, potassium perborate, or sodium perborate). The oxidizing agent is usually used in an amount of 0.1 to 3% on the basis of the weight of the total monomers.

The amount of the reducing agent is not critical, but is usually in the range of 0.25 to 3 times of the amount of the oxidizing agent.

Suitable examples of the copolymerizable monomers used in the present invention, for producing an aqueous dispersion of a crosslinked ethylene-vinyl acetate copolymer, are functional monomers, such as glycidyl compounds (e.g. acryl glycidyl ether, glycidyl acrylate, glycidyl methacrylate, or glycidyl vinyl ether), carboxyl group-containing compounds (e.g. acrylic acid, methyacrylic acid, crontonic acid, itaconic acid, itaconic acid semi-ester, maleic acid, or maleic acid semi-ester), alkoxy compounds (e.g. alkoxymethylacrylamide, alkoxyethylacrylamide, N-n-butoxyacrylamide, or alkoxymethylmethacrylamide), amino group-containing compounds (e.g. dimethylamino methyacrylate, or vinylpyridine), isocyanate compounds (e.g. vinyl isocyanate, or allyl isocyanate), amido group-containing compounds (e.g. acrylamide, methacrylamide, or maleinamide), hydroxy group-containing compounds (e.g. acryl alcohol, 2-hydroxyethyl methacrylate, 2-hydroxyethyl acrylate, 2-hydroxpropyl methacrylate, or a polyvalent alcohol monoallyl allyl ether), or the like. These copolymerizable monomers may be preferably used in an amount not more than 10% by weight on the basis of whole weight of the starting monomers, in which range the copolymerizable monomers do not give any undesirable effect on the polymerization reaction. Intramolecular crosslinking agents, such as triallyl cyanurate or divinyl succinate, may also be used as the other copolymerizable monomer.

Moreover, in order to modify the skeleton of the ethylene-vinyl acetate copolymer, there may be added vinyl esters g [e.g. vinyl propionate, or Veova (a trade name of a vinyl ester, made by Shell Chemical], vinyl halides (e.g. vinyl chloride, or vinylidene chloride), acrylic esters (e.g. methyl acrylate, or ethyl acrylate) or the like, which may be used in the ratio of 1.0 to 80% by weight on the basis of the weight of vinyl acetate.

Te emulsifying agent used in the redox emulsion-polymerization process in the present invention is not specifically limited, but various emulsifying agents may be appropriately used in accordance with the utilities of the aqueous dispersion of the ethylene-vinyl acetate copolymer. For instance, various water-soluble, non-ionic, anionic, cationic or ampholytic surfactants can be used alone or in a combination of two or more kinds thereof. Other additives, such as a pH regulator or electrolyte, are also used as in the conventional emulsion-polymerization processes.

The polymerization conditions, such as polymerization pressure and polymerization temperature, are not critical either, but the polymerization reaction is preferably carried out at a polymerization temperature of 0 to 100° C, more preferably 30 to 80° C from the practical viewpoint. Besides, the polymerization pressure is optionally controlled in accordance with the amount of ethylene suitable for the desired copolymer.

The concentration of the solid components in the aqueous dispersion may be regulated by controlling the amounts of the monomers to be copolymerized and water, but may be preferably in the range of 40 to 60% by weight from the standpoint of the utilities of the product.

The present invention is illustrted by the following Examples but is not limited thereto.

EXAMPLE 1

Into a 100 liter pressure vessel equipped with a reaction temperature regulator and a stirrer, there are charged water (24,000 g), a partially hydrolyzed polyvinyl alcohol (saponification degree: 92% by mol, degree of polymerization: 1700; 320 g), a partially hydrolyzed polyvinyl alcohol (saponification degree: 86% by mol, degree of polymerization: 500; 900 g) and $FeSO_4$ (0.4 g). The mixture is heated with stirring for about one hour so that the partially hydrolyzed polyvinyl alcohol is completely dissolved. After cooling the mixture to about 30° C, to the resultant mixture are added vinyl acetate (29,000 g) and an 8% aqueous solution of glyoxal-sodium bisulfite (1,650 g).

The mixture is regulated to pH 4.5 with HCl. The reaction vessel is purged with nitrogen and ethylene to remove oxygen therefrom. The mixture is heated to 55° C, during which ethylene is added to the vessel so that the pressure becomes 45 kg/cm². After the dissolution of ethylene in vinyl acetate monomer reaches equilibrium a 0.45% aqueous hydrogen peroxide solution is added to the mixture at the rate of 1.4 liter/hour. After 10 minutes, the polymerization reaction initiates, which is confirmed by the reaction temperature. The polymerization temperature is controlled at 60° C by the reaction temperature regulator.

The temperature of the jacket for cooling is set at 30° C, and the charging of hydrogen peroxide is switched to automatic charging, and thereby the polymerization temperature can constantly be kept at 60° C, during which the polymerization pressure is constantly kept at 45 kg/cm².

After 6.4 hours from the initiation of the polymerization reaction, the unreacted vinyl acetate monomer is decreased to 0.2%, and then the polymerization is finished.

The aqueous dispersion of ethylene-vinyl acetate copolymer thus obtained has a content of the solid components of 56.0 % by weight, a viscosity (BL-60 RPM, 25° C) of 2,200 cps and an ethylene content of 16% by weight.

EXAMPLE 2

Into a 100 liter pressure vessel equipped with a reaction temperature regulator and a stirrer, there are charged water (34,000 g), hydroxyethyl cellulose (ethylene oxide addition amount: about 2.5 mol, 365 g), polyoxyethylene nonylphenol ether (HLB: 17, 800 g) and polyoxyethylene nonylphenol ether (HLB: 14, 800 g). The mixture is heated with stirring for about one hour so that the mixture is completely dissolved. After cooling to about 30° C, to the mixture are added vinyl acetate (8,500 g), acetic acid (16 g), sodium acetate (20 g), $FeSO_4$ (0.8 g) and an 8% aqueous solution of glyoxal-sodium bisulfite (2,880 g).

The reaction vessel is purged with nitrogen and ethylene to remove oxygen. Then, the mixture is heated to 45° C, during which ethylene is added thereto so that the pressure becomes 70 kg/cm². After the dissolution of ethylene in vinyl acetate monomer reaches equilibrium, an 8% aqueous solution of ammonium persulfate is added thereto at the rate of 1.4 liter/hour. After about 5 minutes, the polymerization reaction initiates, which is confirmed by the reaction temperature. The polymerization temperature is controlled at 50° C by the reaction temperature regulator. Then, vinyl acetate (20,000 g) and N-n-butoxyacrylamide (250 g) are added to the mixture in a period over 5 hours at a constant speed, during which the temperature of the jacket for cooling is set at 30° C and the charging of ammonium persulfate is switched to automatic charging, and thereby the polymerization temperature can constantly be kept at 50° C, and the polymerization pressure is constantly kept at 70 kg/cm² with ethylene.

After 9 hours from the initiation of the polymerization reaction, the unreacted vinyl acetate monomer is decreased to 0.48%, and then the polymerization is finished.

The aqueous dispersion of ethylene-vinyl acetate copolymer thus obtained has a content of the solid components of 52.7% by weight, a viscosity (BL-60 RPM, 25° C) of 1,330 cps and an ethylene content of 30% by weight.

EXAMPLE 3

Into a 100 liter pressure vessel equipped with a reaction temperature regulator and a stirrer, there are charged water (34,000 g), hydroxyethyl cellulose (ethylene oxide addition amount: 2.5 by mol, 365 g), polyoxyethylene nonylphenol ether (HLB: 17, 800 g) and polyoxyethylene nonylphenol ether (HLB: 14, 800 g). The mixture is heated with stirring for about one hour so that the mixture is completely dissolved. After cooling to about 30° C, to the mixture are added vinyl acetate (8,500 g), acetic acid (16 g), sodium acetate (20 g), $FeSO_4$ (0.8 g) and a 40% aqueous solution of glyoxal (118 g).

The reaction vessel is purged with nitrogen and ethylene to remove oxygen. The mixture is heated to 45° C during which an 8% aqueous solution of sodium bisulfite (0.78 liter) is added to the mixture and ethylene is added so that the pressure becomes 70 kg/cm². After the dissolution of ethylene in vinyl acetate monomer reaches equilibrium, 8% aqueous solution of ammonium persulfate is added to the mixture at the rate of 1.4 liter/hour. After about 5 minutes, the polymerization reaction initiates, which is confirmed by the reaction temperature, and the polymerization temperature is controlled to 50° C by the reaction temperature regulator.

Then, an 8% aqueous solution of sodium bisulfate is added to the mixture at the constant rate of 0.17 liter/hour in a period over 8 hours, and further vinyl acetate (20,000 g) and N-n-butoxyacrylamide (250 g) are also added thereto at a constant rate in a period over 5 hours, during which the temperature of the jacket for cooling is set at 30° C and the charging of ammonium persulfate is switched to automatic charging, and thereby the polymerization temperature can constantly be kept at 50° C, and the polymerization pressure is constantly kept at 70 kg/cm² with ethylene.

After 9.2 hours from the initiation of the polymerization reaction, the unreacted vinyl acetate monomer is decreased to 0.40%, and then the polymerization is finished.

The aqueous dispersion of ethylene-vinyl acetate copolymer thus obtained has a content of the solid components of 53% by weight, a viscosity (BL-60 RPM) of 1,360 cps and an ethylene content of 29.7% by weight.

Reference Example 1

The polymerization is carried out in the same manner as described in Example 1, excepting that formaldehyde sodium sulfoxylate is used as the reducing agent (the initiation time of the polymerization, the reaction speed and the addition speed of hydrogen peroxide are approximately the same).

Reference Example 2

The polymerization is carried out in the same manner as described in Example 2, excepting that formaldehyde sodium sulfoxylate is used as the reducing agent (the initiation time of the polymerization, the reaction speed and the addition speed of ammonium persulfate are approximately the same).

Reference Example 3

The polymerization is carried out in the same manner as described in Example 2, excepting that glyoxal is used as the reducing agent in the same molar amount as that of glyoxal-sodium bisulfite. Within about 3 hours from the initiation of the addition of the 8% aqueous solution of ammonium persulfate, about 4.2 liters of the aqueous solution of ammonium persulfate is added, but no exothermic reaction occurs.

Reference Example 4

The polymerization is carried out in the same manner as described in Example 2, excepting that sodium bisulfite is used as the reducing agent in the same molar amount as that of glyoxal-sodium bisulfite. After about 60 minutes from the initiation of the addition of the aqueous solution of ammonium persulfate (about 1.4 liters of the solution is added), a violent exothermic reaction occurs. Then, the addition of ammonium persulfate is immediately stopped and the mixture is cooled, but the polymerization temperature raises to 75° C. Thereafter, the polymerization temperature can not automatically be controlled, and the temperature can hardly be controlled to the desired temperature even by hand operation.

Reference Example 5

The polymerization is carried out in the same manner as described in Example 3, excepting that formaldehyde sodium sulfoxylate is used as the reducing agent to give an aqueous dispersion of ethylene-vinyl acetate copolymer.

The products obtained in the above Examples and Reference Examples are subjected to the following tests.

Test 1

The aqueous dispersions obtained in Example 1, 2 and 3 and Reference Examples 1 and 2 are impregnated into a filter paper (Toyo Roshi No. 2). After drying at 20° C, the resulting filter paper is subjected to the quantitative analysis of formaldehyde in accordance with the provision of Ordinance No. 34 of Ministry of the Health and Welfare in Japan. The results are shown in the following Table 1.

Table 1

| Aqueous dispersion | Amount of aqueous dispersion impregnated (% by weight) | Amount of formaldehyde (ppm) |
|---|---|---|
| - (only filter paper) | — | Not detectable |
| Product of Example 1 | 10 | Not detectable |
|  | 30 | " |
| Product of Example 2 | 10 | Not detectable |
|  | 30 | " |
| Product of Example 3 | 10 | Not detectable |
|  | 30 | " |
| Product of Reference Example 1 | 10 | 21.0 |
|  | 30 | 38.6 |
| Product of Reference Example 2 | 10 | 24.0 |
|  | 30 | 44.0 |

Test 2

The aqueous dispersions of Example 3 and Reference Example 5 (they are used as a binder for non-woven fabric) are each impregnated into non-woven webs consisting of 100% rayon at an impregnation rate of 30% by weight. The resulting webs are dried at 130° C for 1.5 minutes and further are heated at 130° C for 5 minutes to give a non-woven fabric having a basis weight of 50 g/m$^2$. The properties of the non-woven fabric are shown in the following Table 2.

As is made clear from the results, the non-woven fabric tested with the aqueous dispersion of the present invention does not contain formalin and the properties of the non-woven fabric are similar to those of the non-woven fabric treated with the aqueous dispersion obtained by using formaldehyde sodium sulfoxylate as the reducing agent.

Table 2.

| | Properties of the non-woven fabric | | | |
|---|---|---|---|---|
| Binder | Amount of formalin (ppm) | Tensile strength in dry state (KGSC value) | Tensile strength in wet state (KGSC value) | Trichlene resistance (KGSC value) |
| Product of Ex. 3 | Not detectable | 98 | 64 | 22 |
| Product of reference Ex. 5 | 37 | 94 | 62 | 20 |

[Note]
The properties of the non-woven fabric are measured as follows:
Amount of formalin: In accordance with the provision of Ordinance No. 34 of the Ministry of Health and Welfare in Japan.
Tensile strength: In accordance with the provision of JIS L-1085 (Test of non-woven fabric, Tensile strength). It is shown by the tensile strength in the widthwise direction in KGSC value as follows:

$$KGSC\ value = \frac{Tensile\ strength\ (kg/cm)}{Basis\ weight\ (g/cm^2)}$$

Trichlene resistance: In accordance with the tensile strength as above, which is measured after the non-woven fabric is immersed in trichlene (trichloroethylene at 40° C for one hour.

What is claimed is:

1. A process for producing an aqueous dispersion of an ethylene-vinyl acetate copolymer containing no formalin by emulsion-polymerization ethylene and vinyl acetate and optionally other copolymerizable vinyl monomers in the presence of a redox catalyst consisting of an oxidizing agent and a reducing agent, which is characterized in that a reaction product of a glyoxal compound and an alkali metal, ammonium or zinc salt of a reductive sulfur oxide is used as the reducing agent for the redox catalyst.

2. The process according to claim 1, wherein the reducing agent is a reaction product of a glyoxal compound selected from the group consisting of glyoxal and methyl-glyoxal and a salt selected from the group consisting of (1) a sodium, potassium, ammonium or zinc salt of thiosulfuric acid, dithionous acid or pyrosulfurous acid, (2) sodium bisulfite and (3) potassium bisulfite.

3. The process according to claim 1, wherein the reaction product of the glyoxal compound and the salt of said reductive sulfur oxide is produced in the polymerization system.

4. The process according to claim 1, wherein the reducing agent is used in an amount of 0.25 to 3 times of the amount of the oxidizing agent.

5. The process according to claim 1, wherein said reducing agent is used in combination with a heavy metal salt.

6. The process according to claim 5, wherein said heavy metal salt is an iron salt or copper salt.

7. The process according to claim 1, wherein the amount of copolymerizable monomer is not more than 10% by weight on the basis of the total weight of the starting monomers.

* * * * *